US007593051B2

(12) United States Patent
Suda

(10) Patent No.: US 7,593,051 B2
(45) Date of Patent: Sep. 22, 2009

(54) CCD BREAKAGE PREVENTION SYSTEM

(75) Inventor: Tadaaki Suda, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 286 days.

(21) Appl. No.: 11/346,252

(22) Filed: Feb. 3, 2006

(65) Prior Publication Data

US 2006/0176386 A1    Aug. 10, 2006

(30) Foreign Application Priority Data

Feb. 4, 2005    (JP)    ............. 2005-028695

(51) Int. Cl.
   *H04N 5/335*    (2006.01)
(52) U.S. Cl. ...................................... 348/311
(58) Field of Classification Search .......... 348/294–324
   See application file for complete search history.

(56) References Cited

U.S. PATENT DOCUMENTS

| 4,807,025 | A  | * | 2/1989  | Eino et al. ............... 348/72  |
| 5,374,953 | A  | * | 12/1994 | Sasaki et al. ............ 348/65  |
| 5,412,478 | A  | * | 5/1995  | Ishihara et al. .......... 348/72  |
| 5,630,179 | A  | * | 5/1997  | Kishida ................... 396/18  |
| 5,672,918 | A  | * | 9/1997  | Kimbrough et al. ...... 307/126 |
| 6,246,432 | B1 | * | 6/2001  | Takami et al. ........... 348/65  |
| 6,324,420 | B1 | * | 11/2001 | Kishida et al. .......... 600/479 |
| 6,797,960 | B1 | * | 9/2004  | Spartiotis et al. ..... 250/370.09 |
| 6,980,233 | B1 | * | 12/2005 | Hirasawa ............... 348/207.1 |
| 2001/0010553 | A1 | * | 8/2001 | Tanaka et al. ........... 348/311 |
| 2004/0046602 | A1 | * | 3/2004 | Yamada .................. 327/535 |
| 2004/0080612 | A1 | * | 4/2004 | Sugimoto ................ 348/65  |

OTHER PUBLICATIONS

U.S. Appl. No. 11/346,251 to Suda, filed Feb. 3, 2006.
U.S. Appl. No. 11/346,250 to Suda, filed Feb. 3, 2006.

* cited by examiner

*Primary Examiner*—Tuan V Ho
*Assistant Examiner*—Kent Wang
(74) *Attorney, Agent, or Firm*—Greenblum & Bernstein, PLC

(57) ABSTRACT

An electronic endoscope is provided with a CCD control system which can prevent CCD breakage caused by a latchup, etc. by detecting a Vsub output error and a Vsub supply error without placing any device near the CCD. The endoscope system has a scope including a CCD placed at the scope's distal end, a driving section that supplies a drive signal to a CCD and drives the CCD and a bias voltage generation that generates a substrate bias voltage, a processor, a voltage monitoring section that monitors the voltage value of the substrate bias voltage, a current consumption monitoring section that monitors the current consumption corresponding to the substrate bias voltage, a drive stopping section that stops supplying the drive signal to the CCD when the voltage monitoring section or the current consumption section determines an error occurs.

11 Claims, 2 Drawing Sheets

CCD BREAKAGE PREVENTION SYSTEM

BACKGROUND OF THE INVENTION

Figure 1:
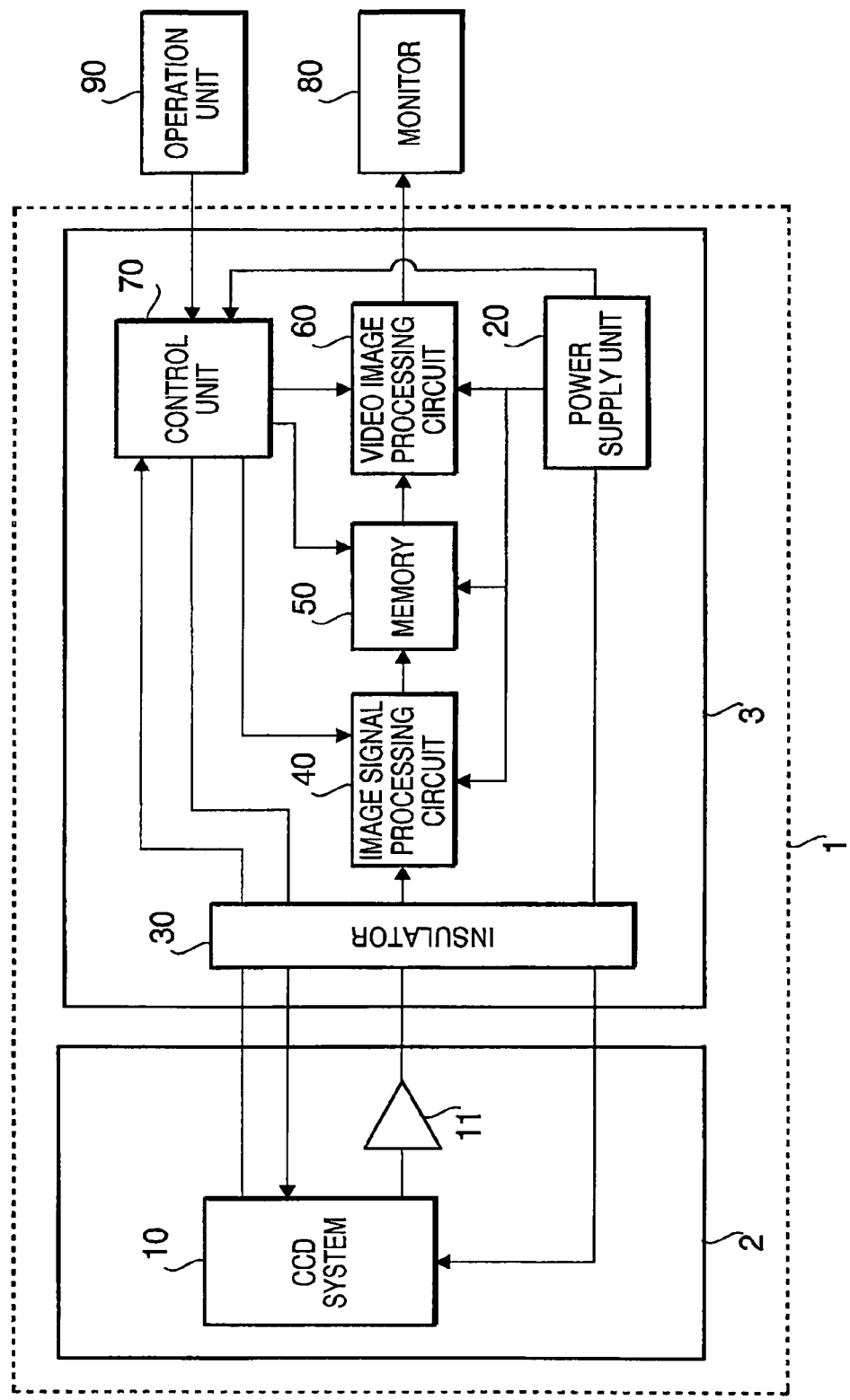

The present invention relates to a CCD control system for prevention of CCD breakage, and an endoscope which includes the CCD control system.

CCD (Charge Coupled Device) is a device that can transform an optical image of a subject formed on a receiving surface into electric signals with an opt-electric conversion. Usually, the electric signals are processed by a signal processing section incorporated in the CCD control unit outside the device, and are output as image signals. It is necessary to supply various kinds of power voltages and clock pulses to drive the CCD. One of the power voltages is a substrate bias voltage (hereinafter referred to as Vsub). Vsub is the reference value of various electric potential distribution inside the device, and Vsub is generated by a Vsub generation circuit. CCDs fall into two classes: an internal Vsub generation type that CCD includes a Vsub generation circuit, and an external Vsub generation type that CCD is supplied Vsub by a Vsub generation circuit incorporated in the CCD control unit outside the CCD.

An electronic endoscope is configured with an insertion tube which is inserted into a human cavity, an operation unit, a scope unit which includes cables and connectors for connection with a processor unit, and the processor unit which has an electric power supply and a light source supplied to the scope unit, and functions such as processing image signals from the scope unit to output to a monitor. Intensive research and development have been made to make the insertion tube as thinner as possible to reduce pain and suffering of patients and to enable observation inside of canals of a human body. Therefore, it is desirable that the smaller CCD is placed at the distal end of the insertion tube of the scope unit.

Because an external Vsub generation type CCD does not require a space for placing a Vsub generation circuit inside the device, it is possible to make the device smaller than an internal Vsub generation type CCD. On the other hand, the external Vsub generation type CCD requires a Vsub supply line from the CCD control unit which has the Vsub generation circuit extended to the CCD. Usually the CCD control unit is located in the scope, but near the processor unit, namely, near the connectors. So, the Vsub supply line is extended to the CCD installed at the distal end of the insertion tube through the scope as well as the other signal lines.

Therefore, in the case of an electronic endoscope with the external Vsub generation type CCD, it is highly possible that Vsub is not input to the CCD or the voltage level lowers, and the other signal, such as a clock pulse, is input, compared with in the case of an electronic endoscope with the internal Vsub generation type CCD. As a result, breakage of the external Vsub generation type CCD more likely caused by a latchup, etc., than the internal Vsub generation type CCD. Possible reasons why Vsub is not input may be a Vsub output error of the Vsub generation circuit such as output power loss of the circuit, a Vsub supply error from the Vsub generation circuit to the CCD such as short-circuit, wire breakage, bad electrical contact in a Vsub supply line. In the case of the electronic endoscope with the external Vsub generation type CCD, it is desirable that the other signal inputs than Vsub are stopped instantaneously when a Vsub output error is detected so as to prevent a latchup, etc.

On the other hand, in order to detect a Vsub supply error and prevent a latchup, etc., it is possible to place a device, etc. near the CCD to monitor the Vsub. But in that case, a space where the device is built in is required together with a signal line to transmit monitor signals to the CCD control circuit. Inevitably, the diameter of the insertion tube becomes larger. Therefore, it is not desirable to place the devices near the CCD, since thinness of the insertion tube is substantially important in an endoscope. Consequently, in the conventional electronic endoscope with the external Vsub generation type CCD, Vsub power loss caused by a Vsub supply error cannot be detected when the diameter of the insertion tube is kept small. As a result, there is a problem that a latchup, etc. more likely cause the CCD breakage than in the case of the internal Vsub generation type CCD, because the CCD receives a signal input in the condition that Vsub lowers.

SUMMARY OF THE INVENTION

The present invention is advantageous in that a CCD control system is provided that prevents CCD breakage caused by a latchup, etc., by detecting a Vsub output error and a Vsub supply error without placing any device near the CCD. The present invention is also advantageous in that an electronic endoscope with the CCD control system that prevents CCD breakage caused by a latchup, etc. by detecting a Vsub output error and a Vsub supply error without making the diameter of the insertion tube larger.

According to an aspect of the invention, there is provided a CCD control system including a driving section that supplies at least one drive signal to a CCD and drives the CCD, a bias voltage generation section that generates a substrate bias voltage, a voltage monitoring section that monitors the voltage value of the substrate bias voltage, a current consumption monitoring section that monitors the current consumption corresponding to the substrate bias voltage, and a drive stopping section that stops supplying the drive signal to the CCD at least one of when the voltage monitoring section determines a first error occurs and when the current consumption monitoring section determines a second error occurs. The driving section, the bias voltage generation section, the voltage monitoring section, the current consumption monitoring section and the drive stopping section are located apart from the CCD.

Therefore, a latchup, etc., can be prevented, since the configuration of the CCD control system in accordance with the present invention described above enables to detect a Vsub output error and a Vsub supply error and to stop the drive signal without placing any device near the CCD. When the CCD control system according to the invention is introduced, any change near the CCD is not necessary.

Optionally, the voltage monitoring section may determine that the first error occurs when the substrate bias voltage generated by the bias voltage generation section is equal or less than a first predetermined threshold value. The current consumption monitoring section may determine that the error occurs when the current value corresponding to the substrate bias voltage is equal or less than a second predetermined threshold value.

Optionally, the drive stopping section may transmit a predetermined signal from at least one of the voltage monitoring section and the current consumption monitoring section to the driving section in order to stop supplying the drive signal to the CCD.

Further optionally, at least one of the voltage monitoring section and the current consumption monitoring section may transmit an error detection signal when the monitoring section detects the error.

According to another aspect of the invention, there is provided an electronic endoscope system including: a scope having a CCD placed at the distal end of the scope, a driving section that supplies at least one drive signal to the CCD and drives the CCD and a bias voltage generation section that generates substrate bias voltage; a processor; a voltage monitoring section that monitors the voltage value of the substrate bias voltage; a current consumption monitoring section that monitors the current consumption corresponding to the substrate bias voltage; and a drive stopping section that stops supplying the drive signal to the CCD in both cases that the voltage monitoring section determines a first error occurs and the current consumption monitoring section determines a second error occurs. The driving section, the bias voltage generation section, the voltage monitoring section, the current consumption monitoring section and the drive stopping section are located apart from the CCD.

Therefore, a latchup, etc., can be prevented with keeping the insertion tube thin, since the configuration of the endoscope in accordance with the present invention described above enables to detect a Vsub output error and a Vsub supply error and to stop the drive signal without placing any device near the CCD. When the CCD control system according to the invention is applied to the conventional electronic endoscope, it can be done with only simple change.

Optionally, the voltage monitoring section may determine that the first error occurs when the voltage generated by the bias voltage generation section is equal or less than a first predetermined threshold value. The current consumption monitoring section may determine that the second error occurs when the current value corresponding to the substrate bias voltage is equal or less than a second predetermined threshold value.

Optionally, the endoscope may have a error detection noticing section that notifies a user when the voltage monitoring section or the current consumption monitoring section detects the error.

Further optionally, the drive stopping section may transmit a predetermined signal from at least one of the voltage monitoring section and the current consumption monitoring section to the driving section in order to stop supplying the drive signal to the CCD.

Optionally, the driving section, the bias voltage generation section, the voltage monitoring section, the current consumption monitoring section and the drive stopping section may be located near the processor inside the scope.

Therefore, the invention enables to provide a CCD control system with the above described configuration which can prevent CCD breakage caused by a latchup, etc., without placing any device near the CCD by stopping the drive signal when a Vsub output error or a Vsub supply error is detected. The invention also enables to provide an endoscope adopting the CCD control system which can prevent CCD breakage caused by a latchup, etc., without making the diameter of the insertion tube larger by stopping the drive signal when a Vsub output error or a Vsub supply error is detected.

BRIEF DESCRIPTION OF THE ACCOMPANYING DRAWINGS

Figure 2:
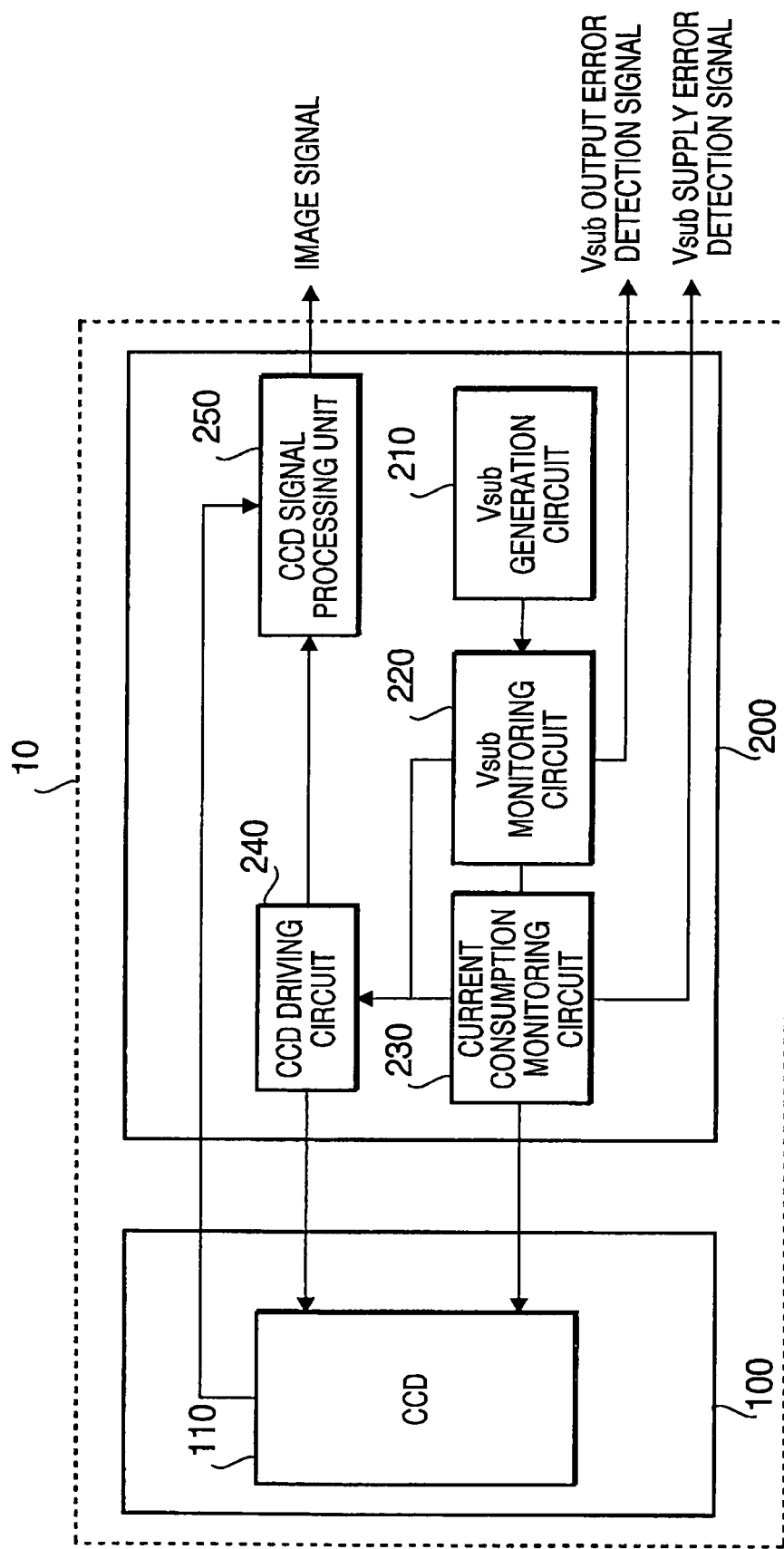

FIG. 1 is a functional block diagram showing a configuration of the electronic endoscope system in an embodiment of the invention; and FIG. 2 is a functional block diagram showing the CCD system shown in the FIG. 1.

DETAILED DESCRIPTION OF THE EMBODIMENTS

Hereinafter, a CCD control system and an electronic endoscope according to an embodiment of the present invention will be described with reference to the accompanying drawings.

FIG. 1 is a function block diagram of an electronic endoscope 1 with a CCD control system according to an embodiment of the present invention. The electronic endoscope 1 includes a scope unit 2 and processor unit 3. The scope unit 2 and the processor unit 3 are connected by connector (not shown). An operation unit 90 and a monitor 80 are connected to the processor unit 3.

The scope unit 2 includes an insertion tube, an operation unit, a forceps insertion port, cables, connectors, etc. (not shown). The scope unit 2 includes therein a CCD system 10 having a CCD section 100 and a CCD control circuit 200 (see FIG. 2), a signal driving circuit 11 which transmits image signals from the CCD system 10, and various other sections such as a light guide, a forceps channel, an operation cable, an air line, a water line (not shown). With handling the scope unit 2, an operator observes and operates inside a human cavity of a patient.

The processor unit 3 includes a power supply unit 20, an insulator 30, an image signal processing circuit 40, a memory section 50, a video image processing circuit 60, and a control unit 70. The processor 3 also includes a light source unit having a lamp, an aperture and a RGB color filter (not shown). The power supply unit 20 supplies electronic power to the image signal processing unit 40, the memory section 50, the video image processing circuit 60, the control unit 70, the CCD system 10 and the signal driving circuit 11.

The insulator 30 have a function to provide electrical insulation between the scope unit 2 and the processor unit 3. The insulator 30 can be configured using any device which can transmit signals and voltages in an isolated state such as an isolation transformer, a photo coupler which includes a LED and a photo diode, or an equivalent IC module. Consequently, circuits in the scope unit 2 are electrically isolated from circuits in the processor unit 3. Therefore, the configuration can prevent an electric shock by an electric leakage to a patient.

Analog image signals output from the CCD system 10 are transmitted to the image signal processing circuit 40 through the signal driving circuit 11 and the insulator 30. The image signal processing circuit 40 applies A/D (analog-to-digital) conversion to the input image signals. The converted digital image signals are stored as R-signals, G-signals, B-signals, respectively, in predetermined areas of the memory section 50 at timing of synchronization signals supplied by the control unit 70. The memory section 50 is controlled by write memory synchronization signals, and then output R-signals, G-signals and B-signals.

Digital image signals which are output from the memory section 50 and synchronized, namely R-signals, G-signals and B-signals, are input to the video image processing circuit 60. The video processing circuit 60 performs D/A conversion, amplification, etc., of the signals, and outputs the signals to the monitor 80 as analog signals. With the monitor 80, an operator can observe and operate an affected area while viewing an image inside a human cavity. The operator can also see a still image with the monitor 80.

The control unit 70 controls the CCD system 10, the image signal processing circuit 40, the memory section 50 and the video image processing circuit 60. The control unit 70 also receives signals from the operation unit 90 according to the operator's action and receives error detection signals from the CCD system 10 which are described later. For example, when an error detection signal is received, it is possible that the video image processing circuit 60 makes the monitor 80 to display the predetermined image or characters, etc., and it is also possible that the control unit 70 makes a buzzer or a speaker, etc. (not shown) to generate the predetermined sound. Due to the configuration, the operator can notice instantly that an error occurs in Vsub input to CCD and driving of CCD stops. The operator can determine in a moment of time whether the error is caused by the output of the Vsub generation circuit or by failure of Vsub supply based on a kind of the image or the characters displayed on the monitor 80.

The signal processing mechanism in the embodiment of the present invention described above is mainly to be applied to frame sequential endoscopes. However, the CCD control system and the electronic endoscope according to the invention can be applied to simultaneous endoscopes or other type of endoscopes.

Next, a CCD control system according to the embodiment of the invention will be described.

FIG. 2 is a function block diagram to show the details of the CCD system 10 shown in the FIG. 1. The CCD system 10 consists of the CCD section 100 and the CCD control circuit 200. The CCD section 100 is located at the distal end of the insertion tube of the scope unit 2, and includes a CCD 110. The CCD control circuit 200 is located near the connector of the scope unit 2, and includes a Vsub generation circuit 210, a Vsub monitoring circuit 220, a current consumption monitoring circuit 230, a CCD driving circuit 240, and a CCD signal processing unit 250. FIG. 2 does not show an electric power source or power supply lines, but each function block included in the CCD control circuit 200 is supplied power by the processor unit 3.

The CCD 110 is a charge coupled device which is one of photoelectric conversion devices. The CCD 110 converts an optical image of intensities of light on a receiving surface of the CCD 110 to signal charges according to the intensities. The output stage of the horizontal CCD is for converting the signal charges into signal voltage changes. The CCD 110 is a sensor device that has such an opt-electric conversion function and each element of the CCD is highly micronized. So, nanofabrication technology of semiconductor processes is applied to a fabrication process of the CCD. Therefore, parasitic transistors are inevitably generated inside the device. As a result, when an input signal voltage other than Vsub is above Vsub, a latchup, etc., occurs and heat generation leads to breakage of the device.

The CCD 110 receives Vsub generated by the Vsub generation circuit 210 and CCD input signals, such as multiple clock pulses, supplied by the CCD driving circuit 240, and transmits accumulated signal charges with photoelectric conversion, thus, outputs electronic signals. In the case of the external Vsub generation type CCD 110 according to the embodiment of the invention, an input terminal for Vsub and input terminals for clock pulses independently exist. Consequently, in the configuration, it is possible that only CCD signals other than Vsub are input while Vsub is not input to the CCD. However, it is not desirable to place a Vsub monitoring circuit near the Vsub input terminal, because if a circuit for monitoring Vsub near the Vsub input terminal, the size of the CCD section is inevitably large and the diameter of the insertion tube becomes larger.

The Vsub generation circuit 210 generates Vsub with the power voltage supplied by the power supply unit 20 of the processors 3. Because Vsub is the reference value of various electric potential distribution inside the CCD, the CCD does not work without the Vsub input. Usually, the voltage value of CCD input signals other than Vsub is lower than Vsub. But in the case Vsub is not input or Vsub lowers, the CCD input signal of which voltage is above Vsub causes a latchup, etc.

The Vsub monitoring circuit 220 monitors the output voltage level of the Vsub generation circuit 210. When Vsub is equal or less than the predetermined voltage value, instantaneously a control signal is sent to the CCD driving circuit 240 and stops sending CCD driving signals, namely clock pulses. Simultaneously, a Vsub output error detection signal is transmitted to the control unit 70 of the processor 3. The predetermined voltage value may be the threshold value determined in design time. Adopting the configuration, when Vsub lowers because of an error of the Vsub generation circuit 210, an input signal to CCD 110 can be stopped so as to prevent latchup generation, etc. When the control unit 70 receives a Vsub output error detection signal, the control unit displays a message on the monitor indicating an error of the Vsub generation circuit 210 so as to notify an operator a cause of driving stop of the CCD 110.

The current consumption monitoring circuit 230 monitors Vsub current consumption of circuits which send input signals to the CCD. If the current consumption becomes below the predetermined value, which may be the threshold value determined in design time, it is considered that the Vsub value input into the CCD 110 unusually lowers because of high-resistance components generated in the circuits such as bad electrical contacts in the Vsub supply lines. If the current consumption is zero, it is considered that the Vsub is not input into the CCD 110 because of wire breakage of the Vsub supply line, etc. Therefore, the current consumption monitoring circuit 230 decides that the Vsub is not normally input into the CCD 110 when the circuit detects lowering of the current consumption value, and send the signal to the CCD driving circuit 240 in order to stop transmission of the CCD drive signals, namely the clock pulses. Simultaneously, a Vsub supply error detection signal is sent to the control unit 70 of the processor 3.

With the configuration of the current monitoring circuit 230 described above, even if the Vsub generation circuit 210 has no error, when there occurs an error in Vsub supply and the Vsub lowers, it is possible to prevent a latchup, etc., by stopping transmission of the signals input into the CCD 110. Thus, a Vsub supply error can be detected without placing any device near the CCD at the distal end of the insertion tube of the scope unit 2. Therefore, by using the CCD control system according to the present invention, the conventional endoscopes can be added the function to prevent a latchup, etc., with simple change. The control unit 70 which receives a Vsub error detection signal can make the monitor 80 to display a message indicating a Vsub supply error so as to notify an operator a cause of stoppage of driving CCD 110.

The CCD signal processing unit 250 receives electronic signals output from the CCD 110, and performs given processes to convert the electronic signals to image signals based on a synchronization signal supplied by the CCD driving circuit 240. The processed image signals are output to the signal driving circuit 11 shown in the FIG. 1 as analog signals.

Consequently, the present invention enables to prevent CCD breakage caused by a latchup, etc., of the CCD 110, without placing any device near the CCD 110 to monitor Vsub, because the current consumption monitoring circuit built in the CCD control circuit 200 detects a Vsub supply error and stops the CCD driving circuit 240. When the invention is applied to endoscopes, it is not necessary to make the diameter of the insertion tube larger. The effect of the invention can be achieved by only modification of the CCD control circuit 200. Therefore, it requires only a little change to add the function to prevent a latchup, etc., to the conventional endoscopes.

The present disclosure relates to the subject matter contained in Japanese Patent Application No. P2005-028695, filed on Feb. 4, 2005, which is expressly incorporated herein by reference in its entirely.

What is claimed is:

1. A CCD control system comprising:
a driving section that supplies at least one drive signal to a CCD to drive the CCD;
a bias voltage generation section that generates a substrate bias voltage;
a voltage monitoring section that monitors the voltage value of the substrate bias voltage;
a current consumption monitoring section that monitors the current consumption corresponding to the substrate bias voltage which is supplied to the CCD; and
a drive stopping section that stops supplying the drive signal to the CCD at least one of when the voltage monitoring section determines a first error occurs and when the current consumption monitoring section determines a second error occurs,
wherein the driving section, the bias voltage generation section, the voltage monitoring section, the current consumption monitoring section and the drive stopping section are located apart from the CCD.

2. The CCD control system according to claim 1, wherein the voltage monitoring section determines that the first error occurs when the substrate bias voltage generated by the bias voltage generation section is equal or less than a first predetermined threshold value.

3. The CCD control system according to claim 1, wherein the current consumption monitoring section determines that the second error occurs when the current value corresponding to the substrate bias voltage is equal or less than a second predetermined threshold value.

4. The CCD control system according to claim 1, wherein at least one of the voltage monitoring section and the current consumption monitoring section is configured to transmit an error detection signal when the monitoring section detects the error.

5. The CCD control system according to claim 1, wherein the drive stopping section is configured to transmit a predetermined signal from at least one of the voltage monitoring section and the current consumption monitoring section to the driving section in order to stop supplying the drive signal to the CCD.

6. An electronic endoscope system comprising:
a scope including a CCD placed at the distal end of the scope;
a driving section that supplies at least one drive signal to the CCD and drives the CCD and a bias voltage generation section that generates a substrate bias voltage;
a processor;
a voltage monitoring section that monitors the voltage value of the substrate bias voltage;
a current consumption monitoring section that monitors the current consumption corresponding to the substrate bias voltage which is supplied to the CCD; and
a drive stopping section that stops supplying the drive signal to the CCD in both cases that the voltage monitoring section determines a first error occurs and the current consumption monitoring section determines a second error occurs,
wherein the driving section, the bias voltage generation section, the voltage monitoring section, the current consumption monitoring section and the drive stopping section are located apart from the CCD.

7. The electronic endoscope system according to claim 6, wherein the voltage monitoring section determines that the first error occurs when the voltage generated by the bias voltage generation section is equal or less than a first predetermined threshold value.

8. The electronic endoscope system according to claim 6, wherein the current consumption monitoring section determines that the second error occurs when the current value corresponding to the substrate bias voltage is equal or less than a second predetermined threshold value.

9. The electronic endoscope system according to claim 6, further comprising an error detection noticing section that notifies a user when the voltage monitoring section or the current consumption monitoring section detects the error.

10. The electronic endoscope system according to claim 6, wherein the drive stopping section is configured to transmit a predetermined signal from at least one of the voltage monitoring section and the current consumption monitoring section to the driving section in order to stop supplying the drive signal to the CCD.

11. The electronic endoscope system according to claim 6, wherein the driving section, the bias voltage generation section, the voltage monitoring section, the current consumption monitoring section and the drive stopping section are located near the proximal end of the scope where the scope is connected to the processor.

* * * * *